(12) United States Patent
Kamakura

(10) Patent No.: US 11,256,103 B2
(45) Date of Patent: Feb. 22, 2022

(54) OPTICAL DEVICE AND WEARABLE DISPLAY DEVICE

(71) Applicant: SEIKO EPSON CORPORATION, Tokyo (JP)

(72) Inventor: Kazuya Kamakura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/004,456

(22) Filed: Aug. 27, 2020

(65) Prior Publication Data
US 2021/0063757 A1    Mar. 4, 2021

(30) Foreign Application Priority Data

Aug. 28, 2019  (JP) .............................. JP2019-155535

(51) Int. Cl.
*G02B 27/01* (2006.01)
*G06F 1/18* (2006.01)

(52) U.S. Cl.
CPC ..... *G02B 27/0176* (2013.01); *G02B 27/0172* (2013.01); *G06F 1/183* (2013.01); *G02B 2027/0169* (2013.01); *G02B 2027/0178* (2013.01)

(58) Field of Classification Search
CPC ............................ G02B 27/01; G02B 27/0176; G02B 27/0172; G02B 6/0085; G02B 2027/0178; G02B 6/0091; G02B 2027/0112; G06F 1/18; G06F 1/203; G06F 1/163; G06F 3/011; G06F 1/1658; H05K 5/04; H05K 7/20963; H05K 5/0017; H05K 5/0026
See application file for complete search history.

(56) References Cited

U.S. PATENT DOCUMENTS

| | | | | |
|---|---|---|---|---|
| 6,421,031 | B1 * | 7/2002 | Ronzani | G02B 27/017 345/8 |
| 6,680,802 | B1 * | 1/2004 | Ichikawa | G02B 27/0172 359/630 |
| 8,814,691 | B2 * | 8/2014 | Haddick | G02B 27/0172 463/42 |
| 9,129,295 | B2 * | 9/2015 | Border | G06F 3/013 |
| 9,207,456 | B2 * | 12/2015 | Hiraide | G02B 27/0172 |
| 9,217,868 | B2 * | 12/2015 | Jacobsen | G02B 27/0172 |
| 9,989,771 | B2 * | 6/2018 | Kamakura | G02C 11/10 |
| 10,025,104 | B2 * | 7/2018 | Kamakura | G02C 7/16 |

(Continued)

FOREIGN PATENT DOCUMENTS

| CN | 209596544 | * | 11/2019 |
|---|---|---|---|
| JP | 2016-039529 A | | 3/2016 |

*Primary Examiner* — Vinh T Lam
(74) *Attorney, Agent, or Firm* — Oliff PLC

(57) ABSTRACT

The present disclosure includes a display element configured to emit imaging light, a main circuit board and the like being a circuit board configured to process a video signal, a board holder being a circuit board holder configured to fix the main circuit board and the like, and a harness coupled to the main circuit board, and the board holder fixes an end portion of the main circuit board in a state where the end portion protrudes to an optical path upstream of the display element. As a result, a space for avoiding interference is provided on the optical path upstream of the display element, namely, on a back surface side of the display element, while suppressing an increase in size of the device toward a lateral side and the like.

13 Claims, 12 Drawing Sheets

(56) References Cited

U.S. PATENT DOCUMENTS

| | | | | |
|---|---|---|---|---|
| 10,073,273 B2* | 9/2018 | Miyao | | G02B 27/0176 |
| 10,203,497 B2* | 2/2019 | Kamakura | | G02B 27/0006 |
| 10,268,042 B2* | 4/2019 | Kamakura | | G02B 27/0103 |
| 10,310,271 B2* | 6/2019 | Potnis | | G02B 27/0955 |
| 10,345,581 B2* | 7/2019 | Kamakura | | G02B 27/0176 |
| 10,718,950 B2* | 7/2020 | Kamakura | | G02B 27/0176 |
| 10,904,669 B1* | 1/2021 | Talakoub | | H04S 7/307 |
| 10,962,784 B2* | 3/2021 | Amitai | | G02B 27/0081 |
| 2002/0149545 A1* | 10/2002 | Hanayama | | G02B 27/017 |
| | | | | 345/7 |
| 2013/0242555 A1* | 9/2013 | Mukawa | | G02B 27/0172 |
| | | | | 362/237 |
| 2015/0177520 A1* | 6/2015 | Hiraide | | G02B 27/0006 |
| | | | | 359/514 |
| 2015/0220157 A1* | 8/2015 | Marggraff | | G06F 1/1686 |
| | | | | 345/156 |
| 2016/0110921 A1* | 4/2016 | Takahashi | | G06F 3/011 |
| | | | | 345/633 |
| 2016/0131912 A1* | 5/2016 | Border | | G02B 5/3025 |
| | | | | 345/8 |
| 2016/0270656 A1* | 9/2016 | Samec | | G02B 21/0032 |
| 2017/0213377 A1* | 7/2017 | Torii | | H04N 21/47 |
| 2017/0235148 A1* | 8/2017 | Kamakura | | G02C 5/126 |
| | | | | 359/630 |
| 2018/0017786 A1* | 1/2018 | Kamakura | | G02B 27/0172 |
| 2018/0219310 A1* | 8/2018 | Lukofsky | | H01R 12/598 |
| 2018/0348529 A1* | 12/2018 | Blum | | G02B 27/0172 |
| 2019/0272802 A1* | 9/2019 | Haba | | G02B 27/0172 |
| 2020/0004022 A1* | 1/2020 | Park | | G02B 27/0189 |
| 2020/0004028 A1* | 1/2020 | Lee | | G02B 27/0176 |
| 2020/0261796 A1* | 8/2020 | Chen | | A63F 13/90 |
| 2020/0310118 A1* | 10/2020 | Kamakura | | G06F 1/203 |
| 2020/0310138 A1* | 10/2020 | Kamakura | | G02B 27/0176 |
| 2020/0310140 A1* | 10/2020 | Kamakura | | H05K 5/04 |
| 2020/0379264 A1* | 12/2020 | Terashima | | G02B 27/0149 |
| 2021/0165213 A1* | 6/2021 | Balachandreswaran | | |
| | | | | H04N 21/4728 |

* cited by examiner

OPTICAL DEVICE AND WEARABLE DISPLAY DEVICE

The present application is based on, and claims priority from JP Application Serial Number 2019-155535, filed Aug. 28, 2019, the disclosure of which is hereby incorporated by reference herein in its entirety.

BACKGROUND

1. Technical Field

The present disclosure relates to an optical device applicable to a wearable display device that presents a virtual image to an observer, and a wearable display device using the optical device.

2. Related Art

For example, when a head-mounted display (HMD) being one aspect of a wearable display device is constituted, it has been known that a heat dissipation sheet or a flexible board is coupled to a display panel (JP-A-2016-39529).

When attempting to reduce a size of the device in the device of JP-A-2016-39529, there is a possibility that interference may occur between a member disposed around the display panel such as the heat dissipation sheet or the flexible board, and a cable (harness) extending from a control board of the device to the outside.

SUMMARY

An optical device according to one aspect of the present disclosure includes a display element configured to emit imaging light, a circuit board configured to process a video signal, a circuit board holder configured to fix the circuit board, and a harness coupled to the circuit board, where the circuit board holder causes an end portion of the circuit board to be disposed in a state where the end portion protrudesg toward a side closer to the harness than to the display element.

DESCRIPTION OF EXEMPLARY EMBODIMENTS

First Exemplary Embodiment

An optical device and a wearable display device including the optical device according to a first exemplary embodiment of the present disclosure will be described below with reference to the drawings.

Figure 1:
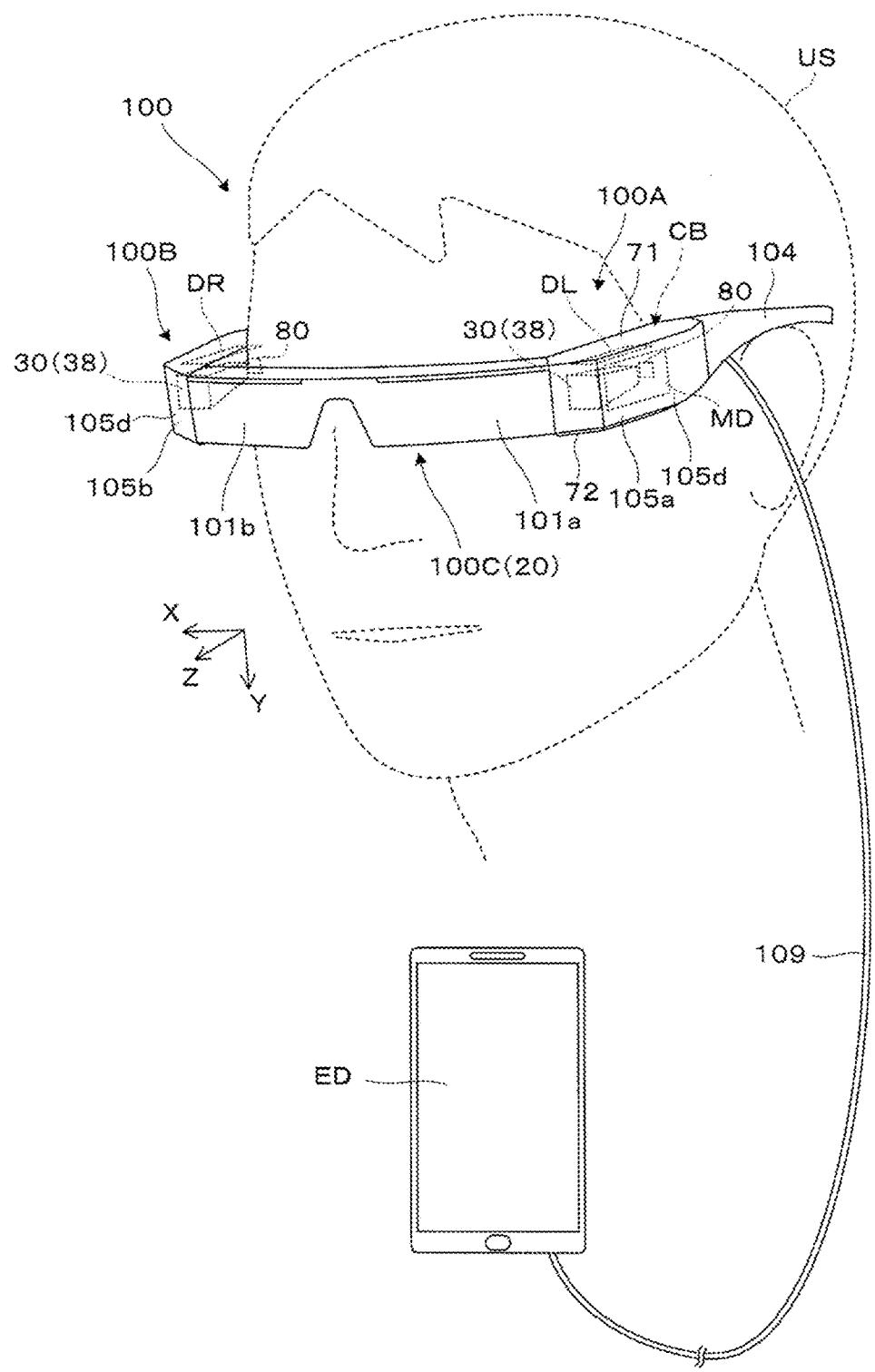
FIG. 1 is a perspective view for illustrating a use state of an optical device and a wearable display device including the optical device according to a first exemplary embodiment.

As illustrated in FIGS. 1 to 4, an optical device 100 or a wearable display device 500 including the optical device 100 according to the present exemplary embodiment is a head-mounted display (HMD) having an eyeglass-like appearance. In FIG. 1 and the like, X, Y, and Z are an orthogonal coordinate system, an +X direction corresponds to a lateral direction in which both eyes of an observer wearing the optical device 100 are aligned, a +Y direction corresponds to a downward direction orthogonal to the lateral direction in which both eyes of the observer are aligned, and a +Z direction corresponds to a forward direction or a front direction of the observer.

As illustrated in FIG. 1 and the like, the optical device 100 can not only cause an observer wearing the optical device 100 or a wearer US to visually recognize a virtual image, but can also cause the observer to observe an external image in a see-through manner. The optical device 100 can be communicatively coupled to a smartphone or another external device ED via a harness 109, and can form a virtual image corresponding to a video signal input from the external device ED, for example. Note that, hereinafter, for convenience of description, the optical device 100 is handled as a virtual display device that causes a virtual image as described above to be visually recognized, and the wearable display device 500 is handled as being constituted by the optical device 100 as described above and a device that inputs an image content, such as the external device ED. In other words, it is assumed that the wearable display device 500 includes the external device ED or a portion corresponding to the external device ED in addition to the optical device 100. However, the wearable display device 500 is not limited to this, and a portion of the optical device 100 itself may be the wearable display device 500. In other words, a portion of that described above from each component to the harness 109 excluding the external device ED may be regarded as the wearable display device 500. In either case, the configuration from each of the above-described components to the harness 109 can be regarded as an optical unit that constitutes an optical device or a wearable display device.

The optical device 100 includes a first display device 100A and a second display device 100B. The first display device 100A and the second display device 100B are portions that respectively form a virtual image for a left eye and a virtual image for a right eye. The first display device 100A for the left eye includes a first virtual image forming optical portion 101a that transparently covers the front of the eye of the observer, and a first image forming body portion 105a that forms imaging light. The second display device 100B for the right eye includes a second virtual image forming optical portion 101b that transparently covers the front of the eye of the observer, and a second image forming body portion 105b that forms imaging light. In other words, images corresponding to the left and right eyes are displayed by the first display device 100A and the second display device 100B.

A temple 104 being a temple portion extending rearward from a side surface of the head is attached to a rear portion of the first and second image forming body portions 105a and 105b, and abuts ears, temples, and the like of the observer, thereby ensuring an attachment state of the optical device 100.

Figure 2:
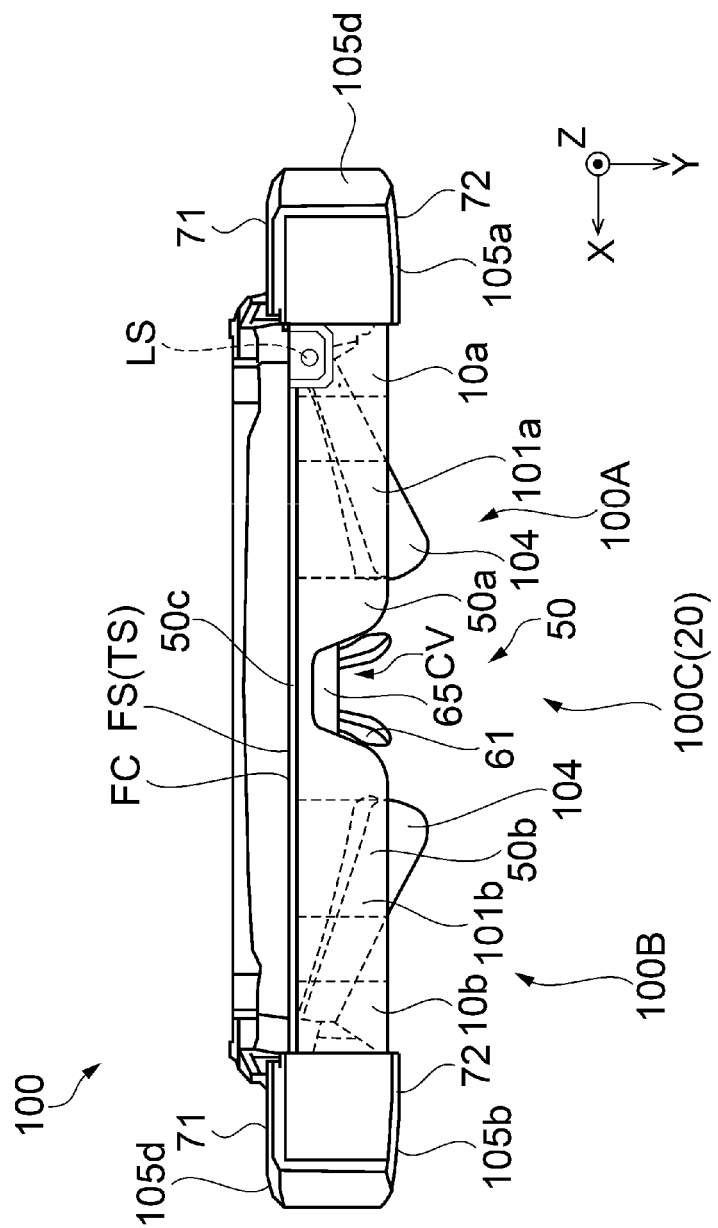
FIG. 2 is a front view illustrating one specific example of an appearance of the optical device.

Further, as illustrated in FIG. 2 and the like, a nose pad 61 that constitutes a support portion along with the temple 104 is provided in a recess CV formed between the first and second virtual image forming optical portions 101a and 101b. The nose pad 61 enables positioning of the virtual image forming optical portions 101a and 101b and the like relative to the eyes of the observer. Thus, the nose pad 61 is assembled to a central member 50 of a see-through light-guiding unit 100C that integrates the first display device 100A and the second display device 100B by a pad support device 65. Note that, although the nose pad 61 and the pad support device 65 are described as being separate herein, a nose pad can be regarded as including not only the nose pad 61 but also the pad support device 65. Note that the see-through light-guiding unit 100C and the central member 50 that constitutes the see-through light-guiding unit 100C will be described later.

Figure 4:
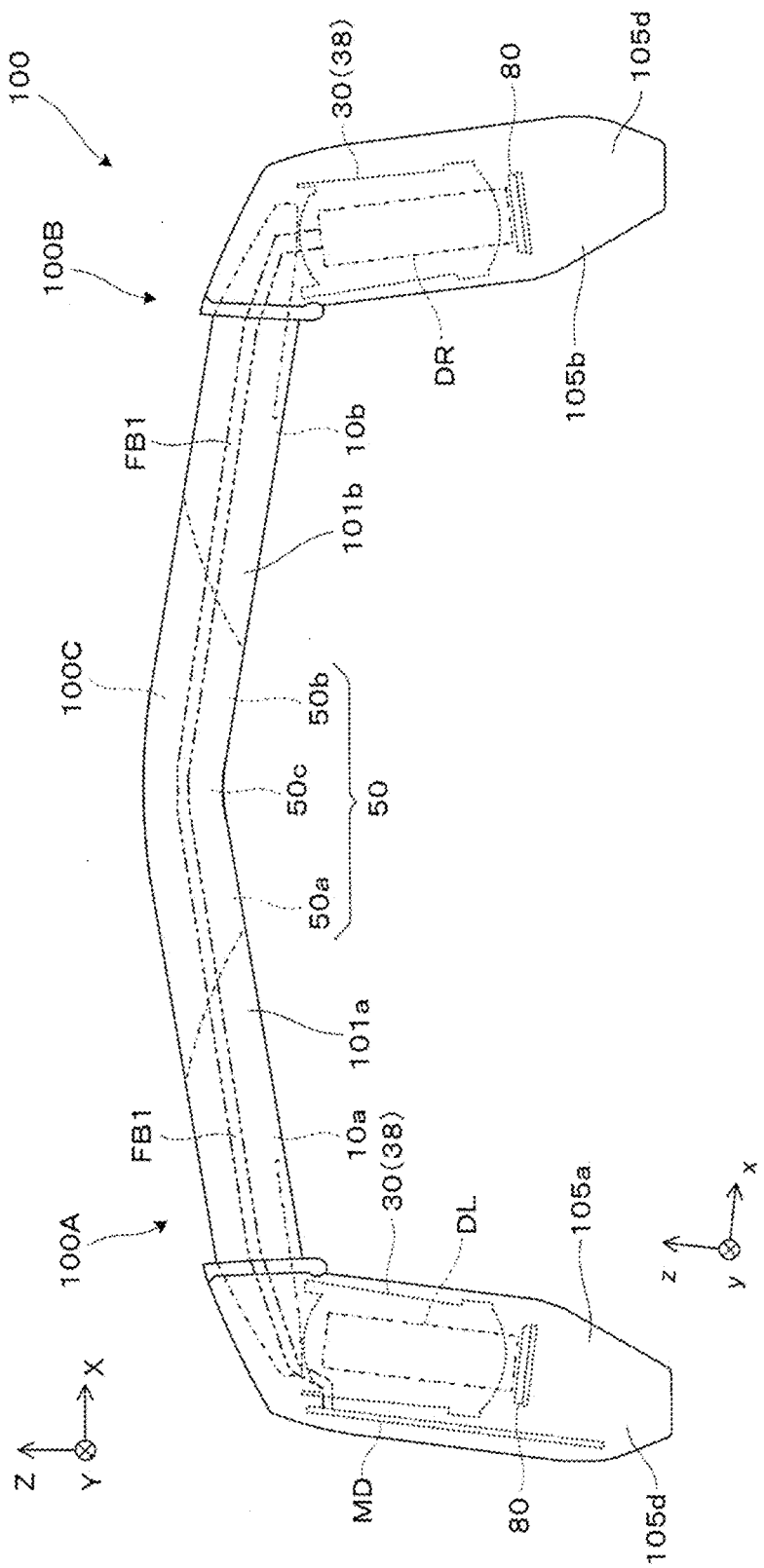
FIG. 4 is a plan view illustrating an optical configuration of the optical device.

The first and second virtual image forming optical portions 101a and 101b respectively include first and second light-guiding members 10a and 10b that are light-guiding bodies (light-guiding optical systems) formed of a resin material and the like, and serve as an integral member by being coupled at the center by the central member 50 and form the see-through light-guiding unit 100C. In other words, the see-through light-guiding unit 100C is a light-guiding unit that includes the pair of light-guiding members 10a and 10b and the central member 50. The pair of light-guiding members 10a and 10b are a pair of optical members that contribute to formation of a virtual image while propagating imaging light internally by constituting the first and second virtual image forming optical portions 101a and 101b. The central member 50 includes a pair of light transmission portions 50a and 50b and a bridge portion 50c that couples the light transmission portions 50a and 50b, is an integrally molded part formed of a resin material and the like, and functions as a coupling member that couples the first display device 100A and the second display device 100B by the pair of light transmission portions 50a and 50b bonding to the pair of light-guiding members 10a and 10b. For more specific description, in the central member 50, the light transmission portion 50a being one of the pair of light transmission portions 50a and 50b is bonded to the light-guiding member 10a, and the other light transmission portion 50b is bonded to the light-guiding member 10b. Note that, in the illustrated example, as illustrated in FIG. 4, for example, a portion of the central member 50 from the bridge portion 50c to the light transmission portion 50a and a portion of the central member 50 from the bridge portion 50c to the light transmission portion 50b are smoothly coupled without having a curve portion (bent portion). The absence of a place such as a curve portion (bent portion) or a step portion avoids double external images being viewed.

Note that the see-through light-guiding unit 100C serves as a light-guiding device 20 being a composite light-guiding optical system that provides video for both eyes to the observer by light guiding, and is supported by an outer packaging 105d in both end portions, namely, on the outer end side of the light-guiding members 10a and 10b.

Figure 3:
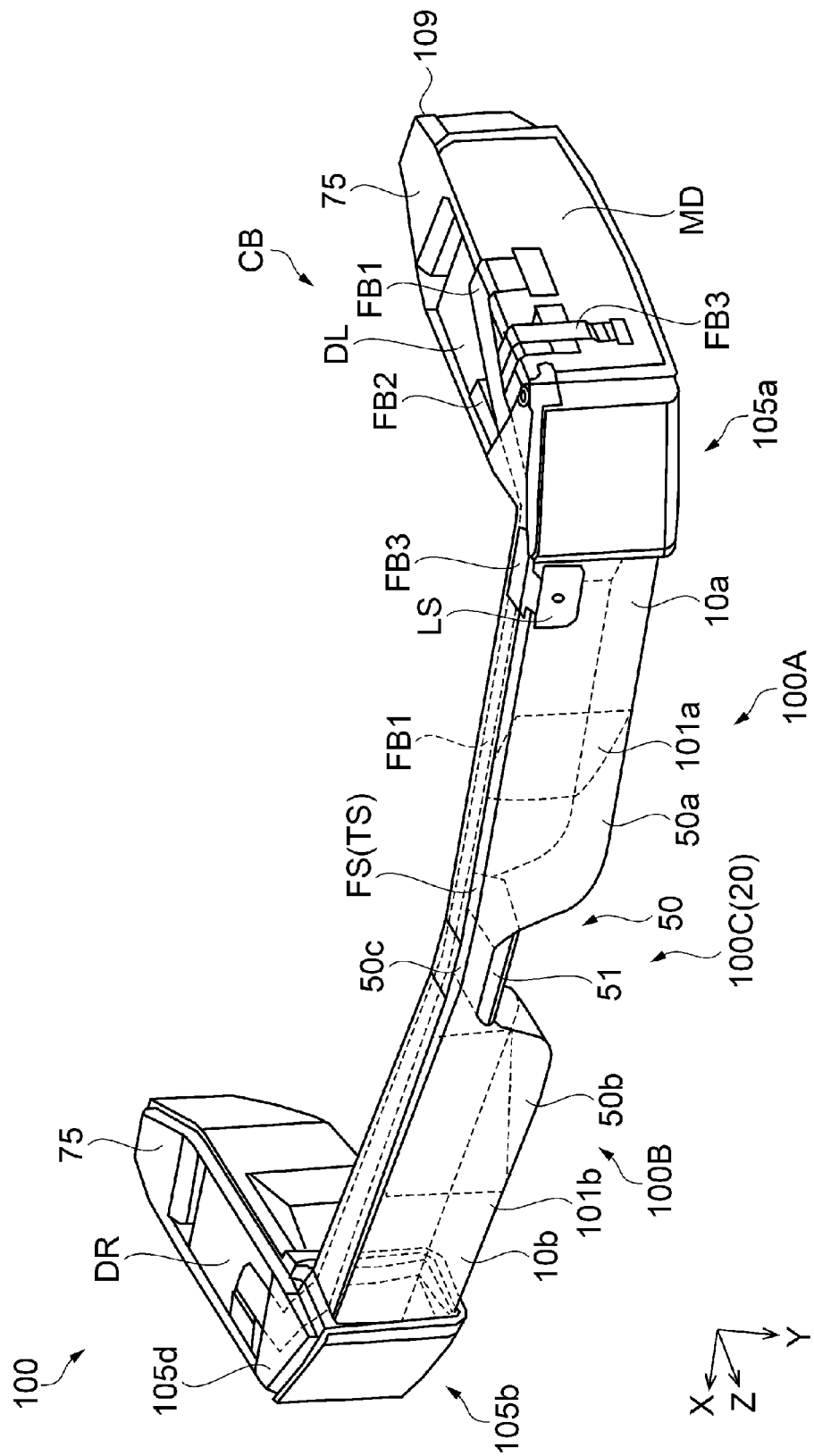
FIG. 3 is a perspective view illustrating an internal structure of the optical device.

In the central member 50, as illustrated in FIG. 3, the bridge portion 50c includes a rib-like protruding portion (rib-shaped portion) 51 at a place of the recess CV formed as a recessed portion that is hollowed between the first display device 100A and the second display device 100B in a lower surface of the see-through light-guiding unit 100C, namely, a surface on the +Y side. The protruding portion 51 reinforces strength of the bridge portion 50c, and also functions as an attachment portion for attaching the pad support device 65 and thus the nose pad 61 (see FIG. 2) to the central member 50.

Places of the see-through light-guiding unit 100C other than those described above will be described below. For example, as illustrated in FIG. 3, the see-through light-guiding unit 100C includes a flat surface FS being flush and extending from the first display device 100A to the second display device 100B as an upper surface TS, namely, a surface on the −Y side.

As illustrated in FIG. 2, a cover member FC (FPC cover) is provided as a cover structural portion on a further upper side of the upper surface TS of the see-through light-guiding unit 100C. A thin and narrow space is formed between the cover member FC and the see-through light-guiding unit 100C, and a cable that electrically couples the first image forming body portion 105a and the second image forming body portion 105b extends. In other words, the cable can be disposed (wired) in the flat surface FS. Thus, a flexible board, namely, a flexible printed circuit (FPC) board is adopted herein as the cable. In other words, as illustrated, wiring by a flexible board FB1 is adopted as a cable. Further, as illustrated in FIG. 3 and the like, a flexible board can also be adopted herein as a cable for coupling each circuit board, and, in the illustrated example, wiring is performed by flexible boards FB2 and FB3 in addition to the flexible board FB1. Furthermore, a flexible board is also applied to coupling between a display element 80 housed in the outer packaging 105d and the circuit board. These points will be described below in detail.

An internal structure of the optical device 100 will be described below in more detail with reference to FIGS. 1 to 4 and the like. In particular, a structure of each component housed in the outer packaging 105d will be described. Here, in FIG. 4, each component for the left eye will be described. x, y, and z are an orthogonal coordinate system, an +x direction and a +y direction are directions indicating in-plane directions parallel to a light emitting surface of the display element 80 that emits imaging light, and the +y direction coincides with, that is, is parallel to, the +Y direction. As illustrated in FIG. 4, the arrangement of the display element 80 and the like is slightly inclined while corresponding to the lateral direction in which both eyes of the observer wearing the optical device 100 are aligned. For example, the +x direction corresponding to the +X direction is slightly different from the +X direction. Similarly, a +z direction is also slightly different from the corresponding +Z direction. In the following description of the arrangement of each component in the internal structure of the optical device 100, for example, description may also be given with reference to the +x direction, the +y direction, and the +z direction. Note that, in this case, the +z direction is a direction from upstream to downstream of an optical path of imaging light in the display element 80 and the vicinity thereof. Note that an expression on the optical path upstream side and the like is assumed to be also adopted for the upstream side (−z side) relative to a light emitting position of the display element 80.

As illustrated in FIG. 1, 3, or 4, the first image forming body portion 105a includes the display element 80, a lens barrel 38, a main circuit board MD, a left eye circuit board DL, and the like in the outer packaging 105d having a cover shape. Note that circuit boards such as the main circuit board MD are collectively referred to as a circuit board CB. On the other hand, the second image forming body portion 105b includes the display element 80, the lens barrel 38, a right eye circuit board DR, and the like in the outer packaging 105d. Note that the outer packaging 105d of the first image forming body portion 105a may be referred to as a first outer packaging 105d for distinction. Similarly, the outer packaging 105d of the second image forming body portion 105b may be referred to as a second outer packaging 105d. Further, the outer packaging 105d is made of, for example, a magnesium alloy and the like.

The outer packaging 105d (see FIG. 2) is constituted by a first member 71 being an upper member and a second member 72 being a lower member, and combines the members 71 and 72 while sliding them on each other in the vertical direction, thereby forming an internal space.

For example, the display element 80 housed in the first outer packaging 105d in the first image forming body portion 105a is a display device that emits imaging light in order to form an image corresponding to a virtual image for the left eye, and is constituted by, for example, an organic EL display panel, an LCD panel, and the like. A projection lens 30 is a projection optical system for emitting imaging light from the display element 80, and constitutes a part of an image formation system in the first virtual image forming optical portion 101a. The lens barrel 38 holds, as a part of the projection lens 30, an optical element for image formation (see FIG. 7) that constitutes the projection lens 30.

Note that, for the second image forming body portion 105b, the display element 80 housed in the second outer packaging 105d and the projection lens 30 including the lens barrel 38 also have the same function in order to form an image corresponding to a virtual image for the right eye.

The main circuit board MD of the circuit board CB is a signal processing board that processes a signal including information from the outside. Here, the information from the outside is typically image data from the external device ED (see FIG. 1). The main circuit board MD has a function of interfacing with the outside and also processes a video signal input from the outside, and manages and controls a display operation of the left eye circuit board DL and the right eye circuit board DR. Thus, for example, the main circuit board MD is coupled to each component by the flexible boards FB1 to FB3 as cables.

The left eye circuit board DL of the circuit board CB is a drive circuit board that drives the display element 80 in the first image forming body portion 105a, and operates under control of the main circuit board MD. In other words, the left eye circuit board DL controls a display operation of the display element 80 for the left eye under control of the main circuit board MD.

The right eye circuit board DR of the circuit board CB is a drive circuit board that drives the display element 80 in the second image forming body portion 105b, and operates under control of the main circuit board MD. In other words, the right eye circuit board DR controls a display operation of the display element 80 for the right eye under control of the main circuit board MD.

The main circuit board MD, the left eye circuit board DL, and the right eye circuit board DR that constitute the circuit board CB can be constituted by including any one or more of circuits such as a digital signal processor (DSP), an application specific integrated circuit (ASIC), a complex programmable logic device (CPLD), a field programmable gate array (FPGA), a graphics processing unit (GPU), and a central processing unit (CPU), for example.

In addition to the above, in the present exemplary embodiment, an illuminance sensor LS is provided as illustrated in FIGS. 2 and 3. The illuminance sensor LS is an ambient light sensor (ALS) and is an outside light sensor that measures ambient light intensity reacted by the observer. Thus, the illuminance sensor LS is disposed in the +Z direction corresponding to the forward direction or the front direction of the observer, and operates under control of the main circuit board MD so as to be able to detect the amount of light entering the eye of the observer.

Note that various circuit boards such as the main circuit board MD are formed of wiring on a surface or inside an insulating resin board, and have a structure in which an IC or an electronic element is mounted on a surface thereof.

In the present exemplary embodiment, as previously mentioned, the flexible boards FB1 to FB3 are adopted as cables for coupling the main circuit board MD to each of the components described above. For example, the right eye flexible board FB1 extends from the first display device 100A to the second display device 100B along the flat surface FS, and couples the main circuit board MD and the right eye circuit board DR. The left eye flexible board FB2 couples the main circuit board MD and the left eye circuit board DL. Further, the flexible board FB3 for an illuminance sensor couples the main circuit board MD and the illuminance sensor LS. Note that these flexible boards FB1 to FB3 are wired in a state of overlapping each other as necessary.

Figure 5:
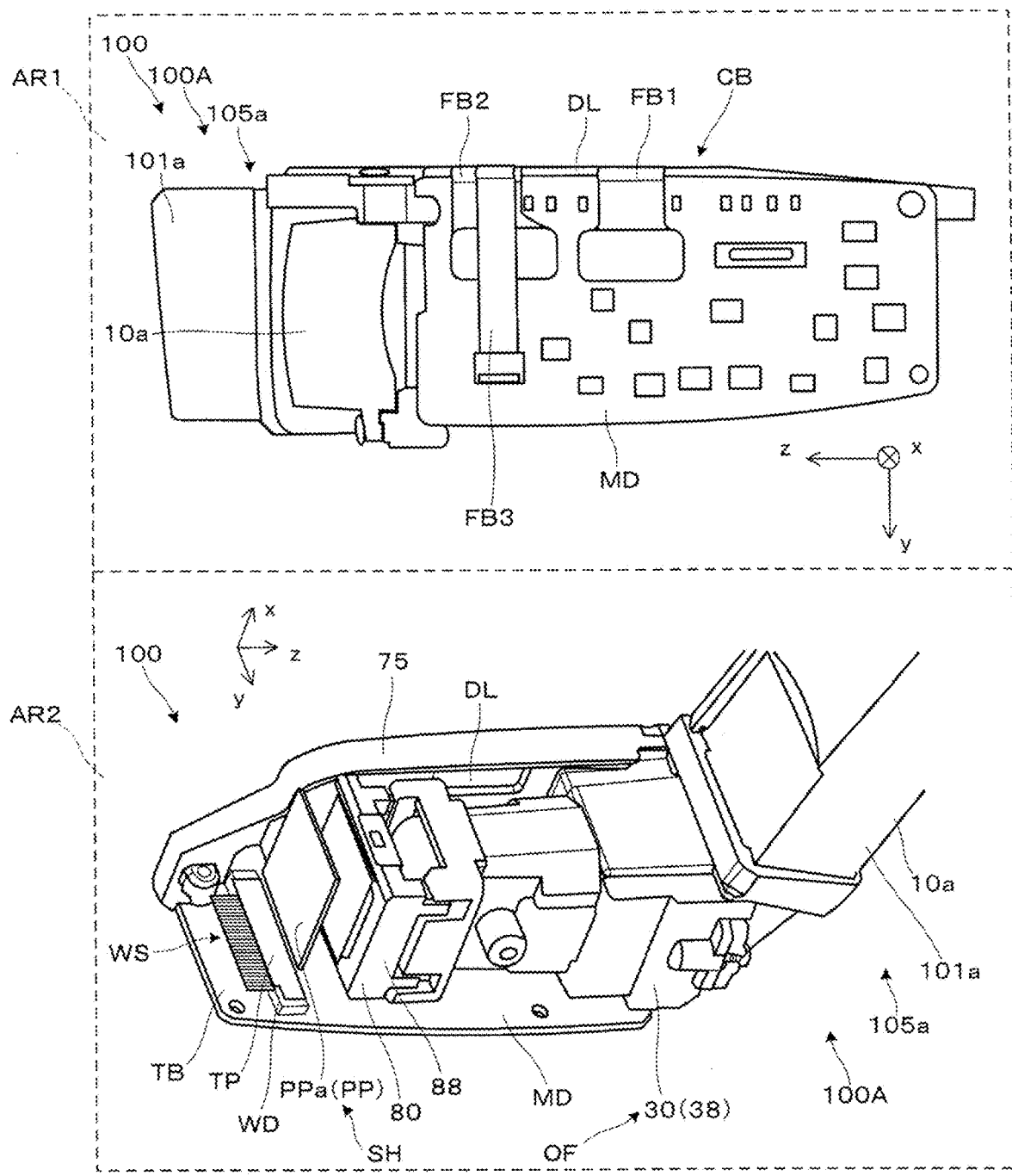
FIG. 5 is a diagram for illustrating assembly of an optical system and a circuit board of the optical device.
Figure 6:
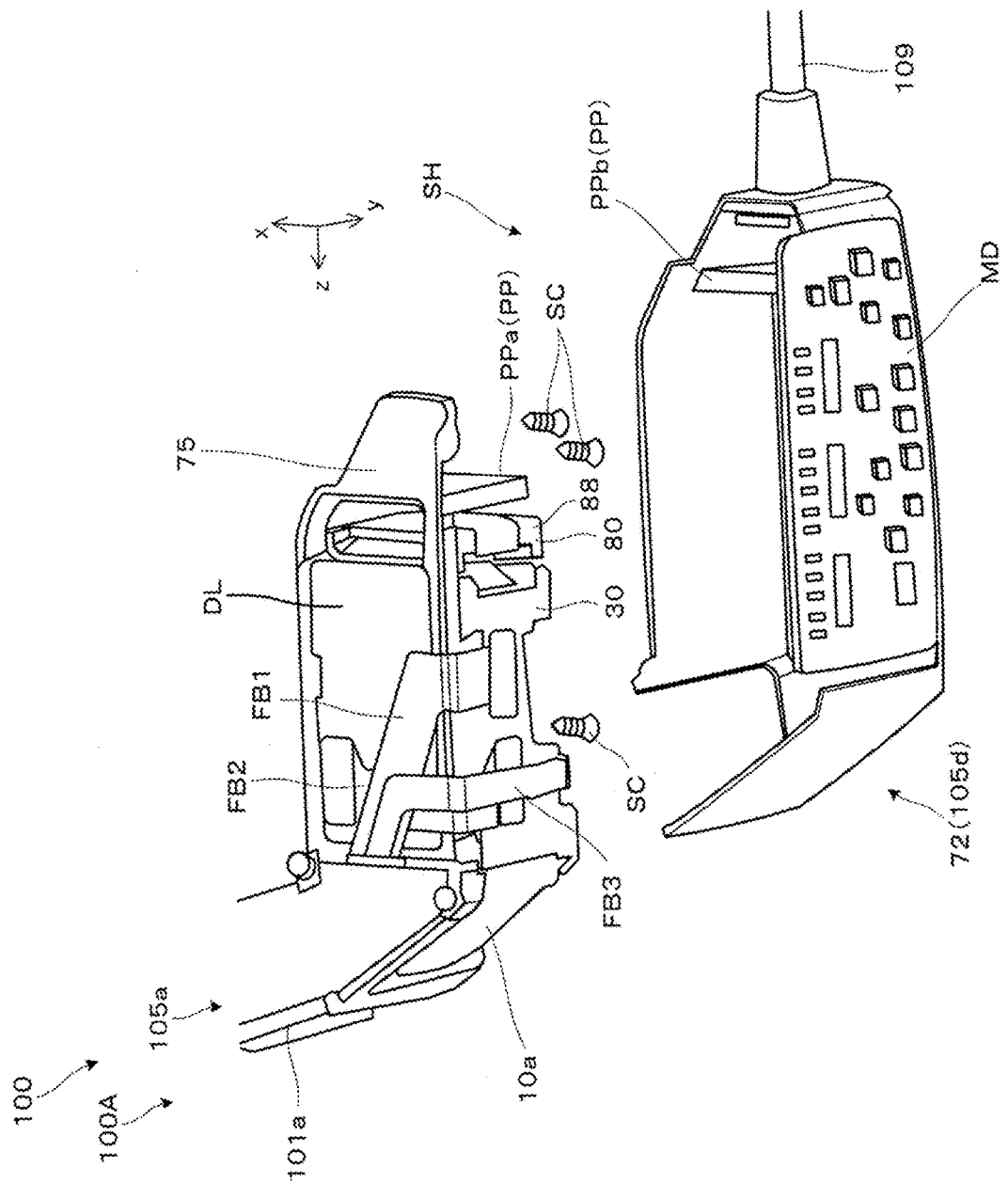
FIG. 6 is an exploded perspective view illustrating assembly of the optical device.
Figure 7:
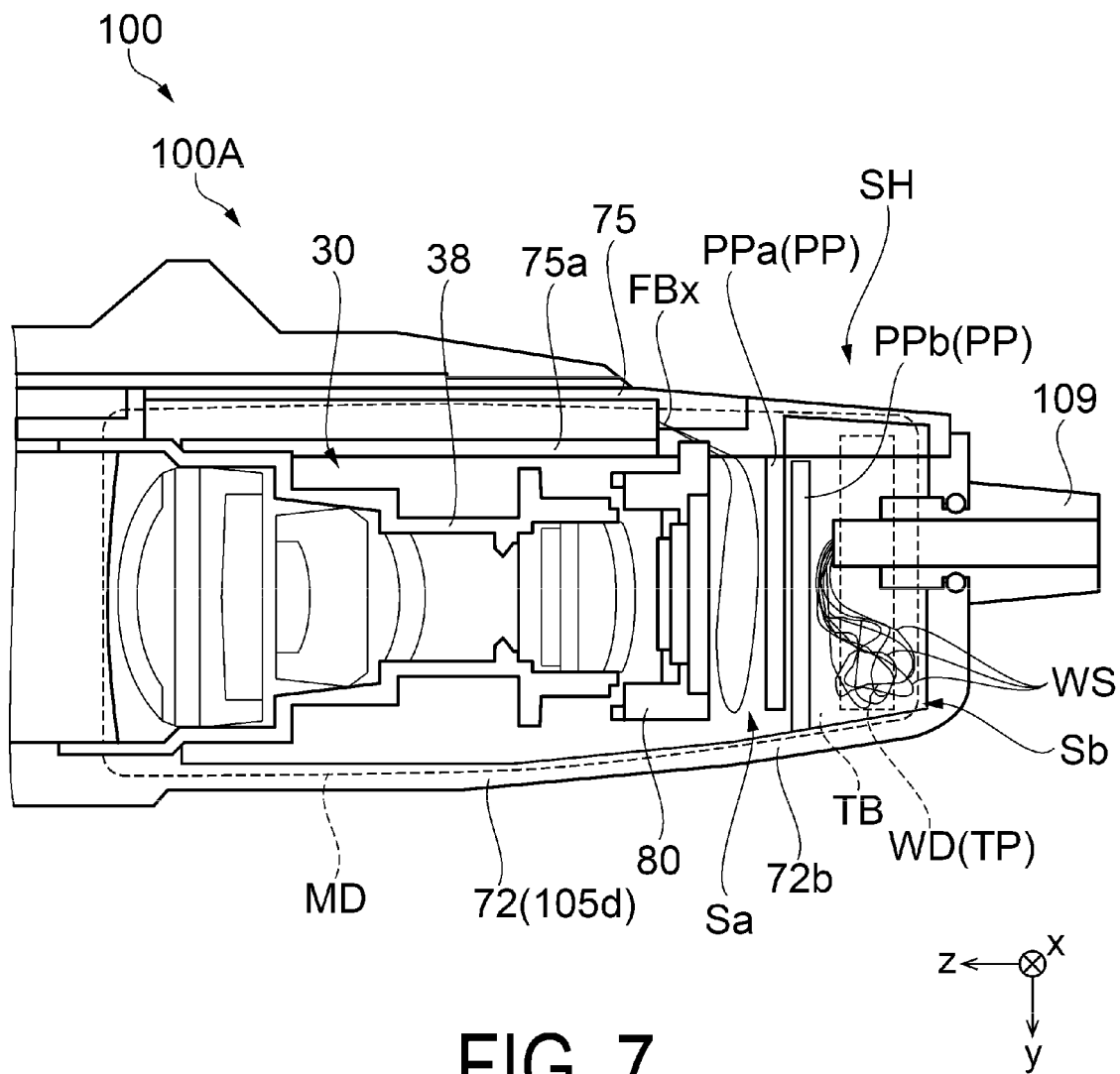
FIG. 7 is a side cross-sectional view illustrating an internal structure of the optical device.

With reference to FIG. 5 and the like, one example of assembly of the optical system including the projection lens 30, the light-guiding member 10a, and the like, and the circuit board including the main circuit board MD and the like of the optical device 100 will be described below. FIG. 5 is a diagram for illustrating the assembly of the optical system and the circuit board of the optical device 100. FIG. 6 is an exploded perspective view illustrating the assembly of the optical device 100. FIG. 7 is a side cross-sectional view illustrating the internal structure of the optical device 100 after the assembly is completed. Note that, in the optical device 100, the first display device 100A and the second display device 100B (see FIG. 2 and the like) have a left-right symmetric and equivalent structure, and thus only the first display device 100A for the left eye will be described below, and the description of the second display device 100B will be omitted.

In FIG. 5, a first region AR1 illustrates a side view of one example of a state in which the main circuit board MD and the like installed inside the outer packaging 105d (see FIG. 2 and the like) are assembled to the projection lens 30 and the like, and a second region AR2 illustrates a perspective view when the state in the first region AR1 is viewed from a different angle. Further, FIG. 6 is an exploded perspective view when the state of the assembly thereof is further viewed from a different angle.

As illustrated in FIGS. 5 and 6, the main circuit board MD and the left eye circuit board DL that constitute the circuit board CB are held by a board holder 75 being a circuit board holder. Further, the board holder 75 is assembled, by screwing or the like using a plurality of screws SC, to a case member 88 that houses the organic EL display panel and the like being a body portion of the display element 80, and an optical fixing member OF such as the lens barrel 38 that houses the optical element being a body portion of the projection lens 30. Note that, in the illustrated example, the lens barrel 38 serves as the optical fixing member OF, and fixes the light-guiding member 10a, namely, the light-guiding optical system in addition to the optical element that constitutes the projection lens 30, namely, the projection optical system. In other words, the optical fixing member OF fixes an optical system for guiding light from the display element 80, and the optical system includes the projection optical system for projecting light from the display element 80, and the light-guiding optical system for guiding light passing through the projection optical system to the front of the eye. Furthermore, the optical fixing member OF is assembled to the board holder 75 being the circuit board holder.

As illustrated in FIG. 6, the board holder 75 assembled to the lens barrel 38 and the like is further assembled to the second member 72 that constitutes the lower side of the outer packaging 105d. The board holder 75 is a molded product formed of a plastic material, and has a heat shielding effect as compared to the outer packaging 105d. The board holder 75 is formed of a plastic material, and thus a shape of the board holder 75 is increased in degree of freedom, and the board holder 75 is easily housed and disposed into the outer packaging 105d.

Further, as illustrated in FIG. 7, in a state after each of the components of the optical device 100 is assembled, a flexible board FBx, a plurality of wires WS constituting the harness 109, and the like are housed in a limited space inside the outer packaging 105d. It is very important to perform spatial segregation and avoid interference of each of the components at a place occupied by each of the components.

Thus, in the present exemplary embodiment, such a problem is solved by disposing the circuit board CB, installing a holding member SH that holds the flexible board FBx and the harness 109 in a separated state, and the like, by using the board holder 75 and the like.

Note that the flexible board FBx couples the display element 80 and the left eye circuit board DL, and transmits an image signal to the display element 80. Further, the harness 109 is coupled to the main circuit board MD, and transmits a signal from the outside such as the external device ED. Further, various types of the harness 109 applied to the signal transmission as described above, namely, a controller cable from the outside are conceivable, but, for example, a cable applicable to a USB Type-C connector may be conceivably adopted, that is, a cable that can be coupled by an USB Type-C connector may be conceivably adopted.

In order to avoid interference between the flexible board FBx and the harness 109, as illustrated in FIGS. 5 to 7, the board holder 75 includes a plate-like portion 75a on which the left eye circuit board DL is placed and also a protrusion portion PPa provided so as to extend integrally from the plate-like portion 75a. For example, as illustrated in the second region AR2 in FIG. 5, FIG. 6, and also FIG. 7, the plate-like portion 75a extends so as to form a surface parallel to the xz plane in order to place the left eye circuit board DL. In contrast, the protrusion portion PPa extends from a lower surface of the plate-like portion 75a toward the lower side (+y side) so as to form a surface parallel to the xy plane on a back surface of the display element 80, namely, on the optical path upstream side (−z side) relative to the display element 80. Furthermore, under such a situation, the board holder 75 causes a part of the main circuit board MD to be disposed in a state of protruding toward the back surface side of the display element 80, and then fixes the part of the main circuit board MD. In other words, a part of the main circuit board MD is in a state of protruding toward a side close to or a side closer to the harness 109. To put the description above in another way, the board holder 75 causes an end portion TB of the main circuit board MD to be disposed in a state of protruding farther toward the optical path upstream side (−z side) than the display element 80, or to be disposed while protruding toward the side close to the harness 109 in that state, and then fixes the end portion TB. Furthermore, with regard to the optical path upstream side and downstream side, namely, the ±z direction, the protrusion portion PPa blocks a space on the end portion TB side and a space on the display element 80 side. In other words, the protrusion portion PPa functions as a partition plate PP that partitions a space on the display element 80 side and a space on the harness 109 side. In particular, as illustrated in FIG. 7, the protrusion portion PPa functions as a member that restricts the flexible board FBx coupled to the display element 80 from entering the harness 109 side.

Further, a wiring lead-out portion WD is provided in the end portion TB of the main circuit board MD. The harness 109 is coupled to the main circuit board MD by attaching, to the wiring lead-out portion WD, a tip portion TP in which the plurality of wires WS constituting the harness 109 are gathered.

Note that, in the illustrated case, the main circuit board MD is provided on the side (−x side) farther from the wearer US (see FIG. 1) than the display element 80, namely, on the outer side. In the end portion TB, the wiring lead-out portion WD is provided on the side closer to the wearer US, that is, on the inner side (+x side). In this case, an effect of heat generation in the main circuit board MD on the wearer US can be suppressed by locating, on the outer side, the main circuit board MD of the circuit board CB that tends to become the highest temperature, and the wiring lead-out portion WD can also be appropriately provided by locating the wiring lead-out portion WD on the inner side while suppressing an increase in size in the lateral direction of the optical device 100.

On the other hand, as illustrated in FIG. 6 and also FIG. 7, the optical device 100 also includes, in the second member 72 that constitutes the outer packaging 105d, a protrusion portion PPb provided so as to extend integrally from a bottom surface portion 72b. The protrusion portion PPb also extends from an upper surface of the bottom surface portion 72b toward the upper side (−y side) so as to form a surface parallel to the xy plane on the back surface of the display element 80, namely, on the optical path upstream side (−z side) relative to the display element 80.

Similarly to the protrusion portion PPa, the protrusion portion PPb also functions as the partition plate PP that partitions a space. In particular, as illustrated in FIG. 7, the protrusion portion PPb functions as a member that restricts the harness 109 from entering the flexible board FBx side coupled to the display element 80.

As described above, in one example herein, the protrusion portions PPa and PPb as the partition plate PP function as the holding member SH that holds the flexible board FBx that transmits an image signal to the display element 80 and the harness 109 in the separated state. In other words, the partition plate PP functions as the holding member SH as described above, and thus interference between the flexible board FBx and the harness 109 can be avoided.

In a further different viewpoint of the description above, the protrusion portions PPa and PPb (partition plate PP) serving as the holding member SH partition a space Sa on the flexible board FBx side and a space Sb on the harness 109 side. In this case, interference between the flexible board FBx and the harness 109 can be avoided by providing the spaces Sa and Sb by the partition plate PP.

As illustrated, the main circuit board MD is larger than the left eye circuit board DL (the left eye circuit board DL is smaller than the main circuit board MD), and the left eye circuit board DL is housed and fixed in the circuit board holder 75 while the left eye circuit board DL is disposed closer to the display element 80 side than the end portion TB of the main circuit board MD with respect to the harness 109. In other words, the main circuit board MD is closer to the harness 109 than the left eye circuit board DL being the drive circuit board.

Figure 8:
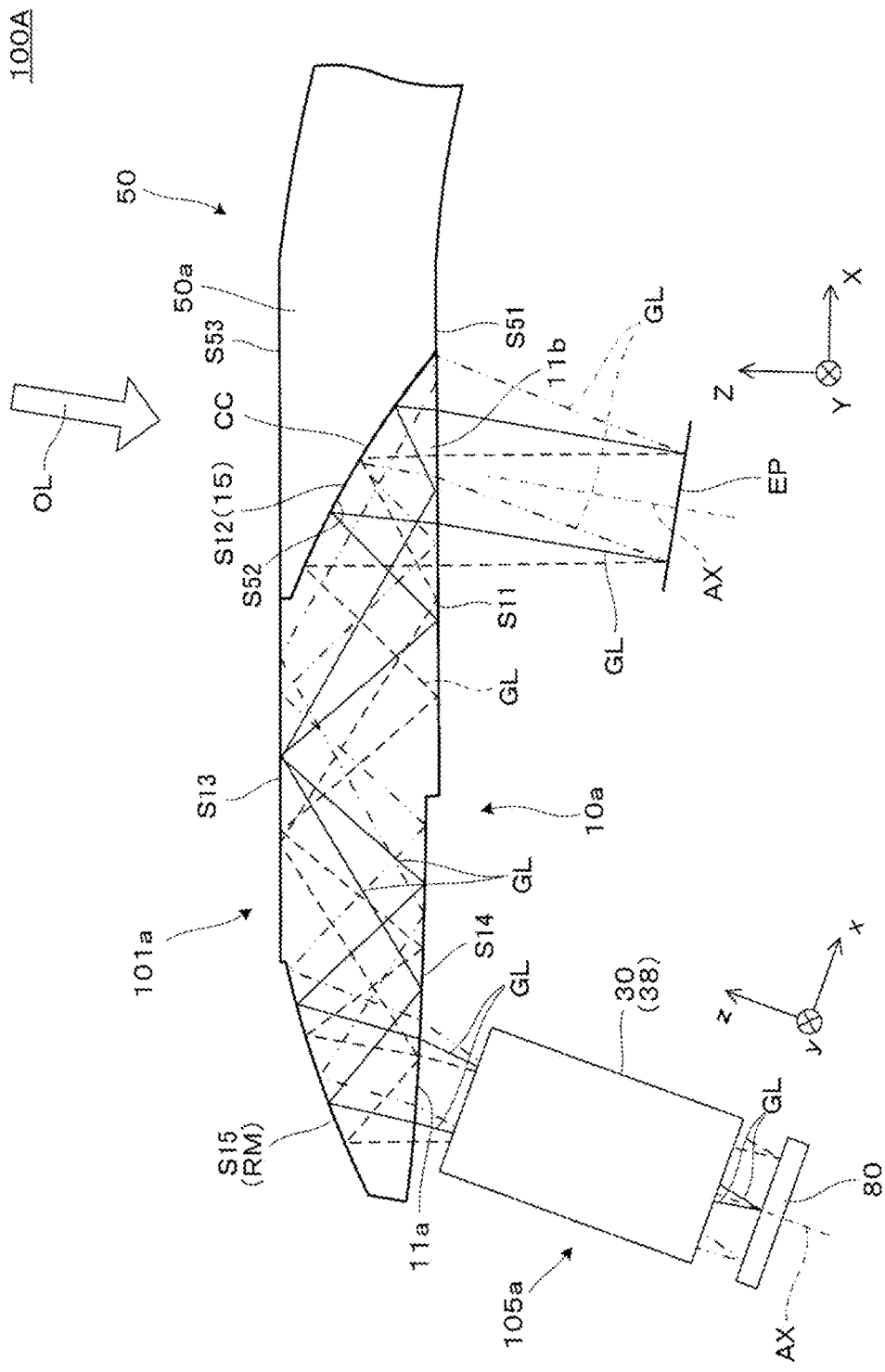
FIG. 8 is a plan view for illustrating an optical structure of the optical device.

An optical structure related to the optical device 100 will be described below with reference to FIG. 8. FIG. 8 is a diagram illustrating a part of the first display device 100A, and particularly illustrates an optical structure of the first virtual image forming optical portion 101a. As previously mentioned, the optical device 100 is constituted by the first display device 100A and the second display device 100B (see FIG. 1 and the like), and the first display device 100A and the second display device 100B also have a left-right symmetric and equivalent structure with respect to the optical structure. Thus, only the first display device 100A will be described, and the description of the second display device 100B will be omitted.

The light transmission portion 50a is a member that is fixed integrally with the light-guiding member 10a, and assists in a see-through function of the light-guiding member 10a. The light transmission portion 50a includes a first transmission surface S51, a second transmission surface S52, and a third transmission surface S53 as side surfaces having an optical function. The second transmission surface S52 is disposed between the first transmission surface S51 and the third transmission surface S53. The first transmission surface S51 is on an extended surface of a first surface S11 of the light-guiding member 10a, the second transmission surface S52 is a curved surface that is bonded to and integrated with a second surface S12, and the third transmission surface S53 is on an extended surface of a third surface S13 of the light-guiding member 10a.

The light-guiding member 10a of the first virtual image forming optical portion 101a is bonded to the light transmission portion 50a via an adhesive layer CC. In other words, the second transmission surface S52 of the light transmission portion 50a is disposed so as to face the second surface S12 of the light-guiding member 10a and has the same shape. The light-guiding member 10a and the light transmission portion 50a have a structure in which a surface of a body member that gives a three-dimensional shape including an optical surface is covered with a thin hard coat layer. The body member of the light-guiding member 10a and the light transmission portion 50a is formed of a resin material with high optical transparency in a visible range, and is molded by, for example, pouring a thermoplastic resin into a metal mold and curing the resin.

An outline of the optical path of imaging light GL will be described below. The light-guiding member 10a guides the imaging light GL emitted from the projection lens 30 toward the eye of the wearer US by reflecting the imaging light GL by the first to fifth surfaces S11 to S15 and the like. Specifically, the imaging light GL from the projection lens 30 is first incident on a portion of the fourth surface S14 formed on a light incidence portion 11a and reflected by the fifth face S15 being an inner surface of a reflection film RM, is incident again from the inner side on the fourth surface S14 and is totally reflected, is incident on and totally reflected by the third surface S13, and is incident on and totally reflected by the first surface S11. The imaging light GL totally reflected by the first surface S11 is incident on the second surface S12, is partially reflected while partially passing through a half mirror 15 provided on the second surface S12, and is incident again on and passes through a portion of the first surface S11 formed on a light emitting portion 11b. The imaging light GL passing through the first surface S11 travels as a whole along an optical axis AX that is substantially parallel to the Z direction, and is incident as a substantially parallel light flux on an exit pupil EP in which the eye of the wearer US is disposed. In other words, the wearer US observes an image formed by the imaging light as a virtual image.

The first virtual image forming optical portion 101a causes the wearer US to visually recognize the imaging light by the light-guiding member 10a, and causes the wearer US to observe an external image having little distortion in a combined state of the light-guiding member 10a and the light transmission portion 50a. At this time, since the third surface S13 and the first surface S11 are flat surfaces substantially parallel to each other, diopter is substantially 0 with respect to observation of light passing through the portion, and almost no aberration or the like occurs in external light OL. Further, the third transmission surface S53 and the first transmission surface S51 are flat surfaces that are substantially parallel to each other. Furthermore, since the first transmission surface S51 and the first surface S11 are flat surfaces that are substantially parallel to each other, almost no aberration or the like occurs. As described above, the wearer US observes an external image that has no distortion through the light transmission portion 50a.

Figure 9:
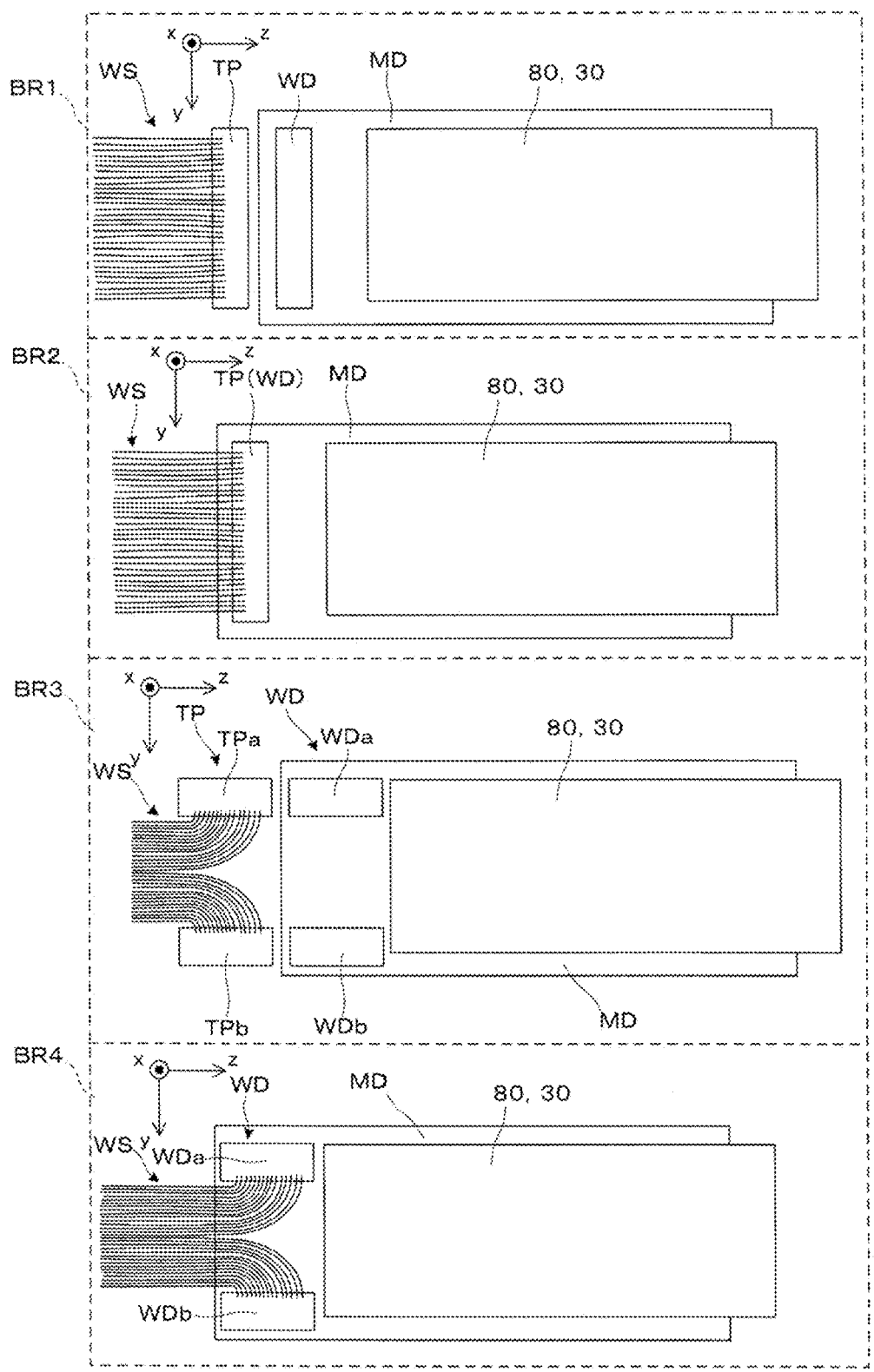
FIG. 9 is a diagram for illustrating an optical device according to one modified example.

An optical device according to one modified example will be described below with reference to FIG. 9. The present modified example is different from one example previously mentioned in a configuration of the wiring lead-out portion WD. FIG. 9 is a diagram for illustrating the optical device 100 according to one modified example. A first region BR1 and a second region BR2 in FIG. 9 are side views conceptually illustrating the wiring lead-out portion WD and a periphery thereof for one example previously mentioned for comparison. In contrast, a third region BR3 and a fourth region BR4 in FIG. 9 are corresponding diagrams of the first region BR1 and the second region BR2 that illustrate the present modified example.

As illustrated and also as previously mentioned, in one example previously mentioned, the plurality of wires WS are gathered in one tip portion TP and attached to the corresponding wiring lead-out portion WD. In contrast, the present modified example has a structure in which the plurality of wires WS are divided into two tip portions TPa and TPb and gathered, and the two tip portions TPa and TPb are attached to two wiring lead-out portions WDa and WDb corresponding to the two tip portions TPa and TPb, respectively. In this way, a configuration in which the wiring lead-out portions WDa and WDb are provided and divided into a plurality of places of the end portion TB can also be achieved.

As described above, the optical device 100 according to the present exemplary embodiment includes the display element 80 that emits imaging light, the main circuit board MD and the like constituting the circuit board CB that processes a video signal, the board holder 75 being a circuit board holder that fixes the main circuit board MD and the like, and the harness 109 coupled to the main circuit board MD, and the board holder 75 causes the end portion TB of the main circuit board MD to be disposed in a state of protruding toward the side closer to the harness 109 than the display element 80. As a result, a space for avoiding interference can be provided on the optical path upstream side of the display element 80, namely, on the back surface side of the display element while suppressing an increase in size of the optical device 100 toward the lateral side and the like.

Second Exemplary Embodiment

An optical device according to a second exemplary embodiment will be described below with reference to FIG. 10. Note that the optical device according to the present exemplary embodiment is a modified example of the optical device 100 according to the first exemplary embodiment, and is different from the first exemplary embodiment in a configuration of the partition plate PP. However, other points are similar to those in the first exemplary embodiment, and thus detailed description of each component other than the components described above will be omitted.

Figure 10:
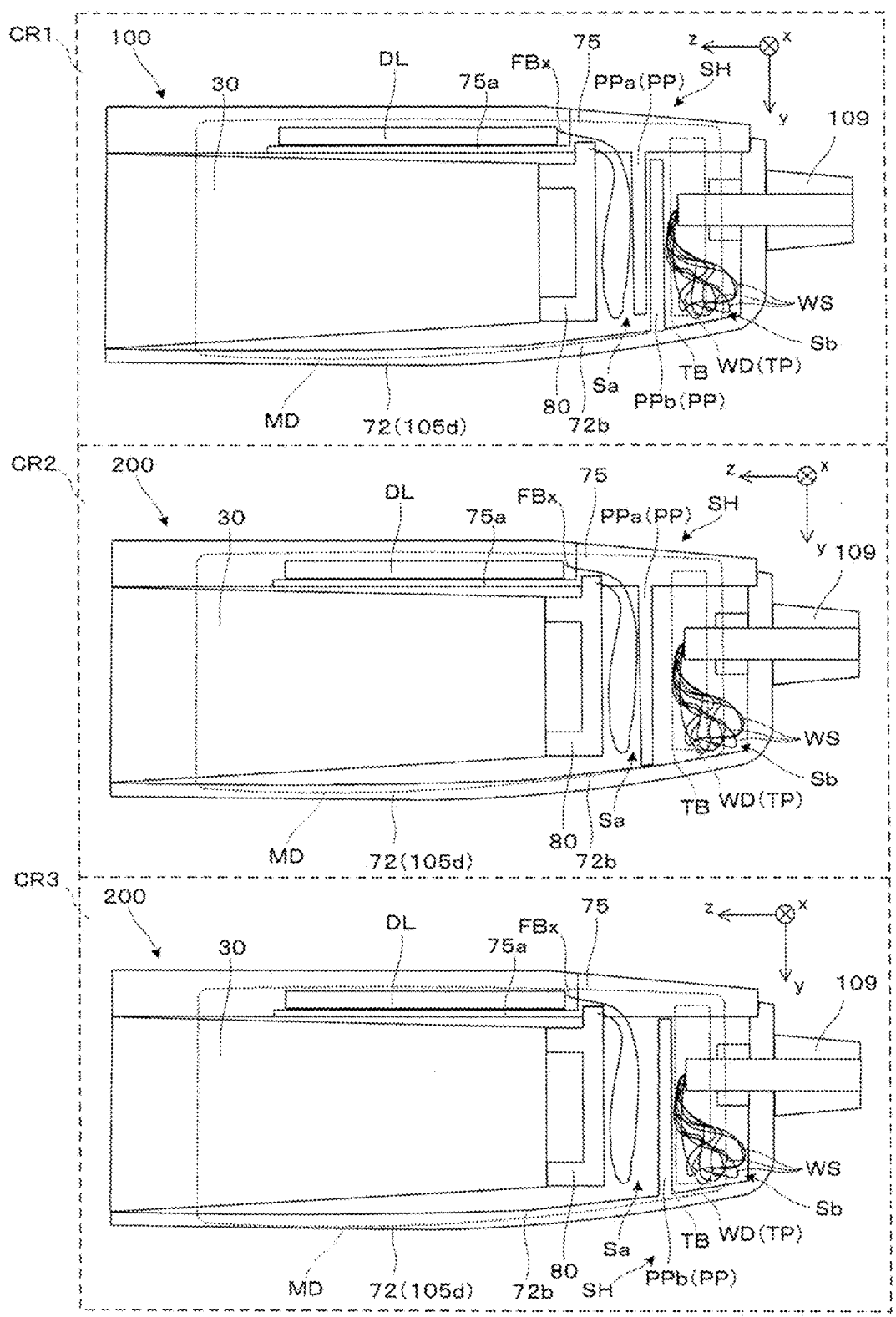
FIG. 10 is a conceptual side cross-sectional view for illustrating an optical device according to a second exemplary embodiment.

FIG. 10 is a conceptual side cross-sectional view illustrating an appearance of an optical device 200 according to the present exemplary embodiment, and corresponds to FIG. 7.

A first region CR1 in FIG. 10 schematically illustrates an outline of the optical device 100 that is one example previously mentioned and illustrated in the first exemplary embodiment, namely, one example illustrated in FIG. 7 for comparison. In contrast, a second region CR2 is a diagram illustrating the optical device 200 as one example of the present exemplary embodiment. Furthermore, a third region CR3 is a diagram illustrating one modified example of the optical device 200 in the present exemplary embodiment.

First, as in one example illustrated in the second region CR2, it is clear from a comparison with the optical device 100 illustrated in the first region CR1 that the optical device 200 in the present exemplary embodiment is different from the optical device 100 in the first exemplary embodiment in that the optical device 200 includes the protrusion portion PPa but does not include the protrusion portion PPb for the partition plate PP. In this case, only the protrusion portion PPa provided on the board holder 75 constitutes the holding member SH that holds the flexible board FBx and the harness 109 in a separated state, and thus interference between the flexible board FBx and the harness 109 can be avoided. Note that, in the illustrated example, the protrusion portion PPa extends to the vicinity of the bottom surface portion 72b of the second member 72, thereby forming the spaces Sa and Sb for avoiding interference.

It is also conceivable that, as in one modified example illustrated in the third region CR3, the optical device 200 in the present exemplary embodiment includes the protrusion portion PPb but does not include the protrusion portion PPa for the partition plate PP. In other words, only the protrusion portion PPb provided on the second member 72 constituting the outer packaging 105d constitutes the holding member SH that holds the flexible board FBx and the harness 109 in a separated state, and thus interference between the flexible board FBx and the harness 109 may be able to be avoided. Note that, in the illustrated example, the protrusion portion PPb extends to the vicinity of the plate-like portion 75a of the board holder 75, thereby forming the spaces Sa and Sb for avoiding interference.

Also, in the optical device 200 according to the present exemplary embodiment, the board holder 75 causes the end portion TB of the main circuit board MD to be disposed in a state of protruding toward the side closer to the harness 109 than the display element 80, namely, the optical path upstream side (−z side), and fixes the end portion TB. Thus, a space for avoiding interference can be provided on the optical path upstream side of the display element 80, namely, on the back surface side of the display element while suppressing an increase in size of the optical device 200 toward the lateral side and the like. Further, the partition plate PP constituted by the protrusion portion PPa or the protrusion portion PPb functions as the holding member SH that holds the flexible board FBx and the harness 109 in a separated state, and thus interference between the flexible board FBx and the harness 109 can be avoided.

Third Exemplary Embodiment

An optical device according to a third exemplary embodiment will be described below with reference to FIG. 11. Note that the optical device according to the present exemplary embodiment is a modified example of the optical device 100 according to the first exemplary embodiment and the like, and is different from the first exemplary embodiment and the like in a structure of the partition plate PP. However, other points are similar to those in the first exemplary embodiment and the like, and thus detailed description of each component other than the components described above will be omitted.

Figure 11:
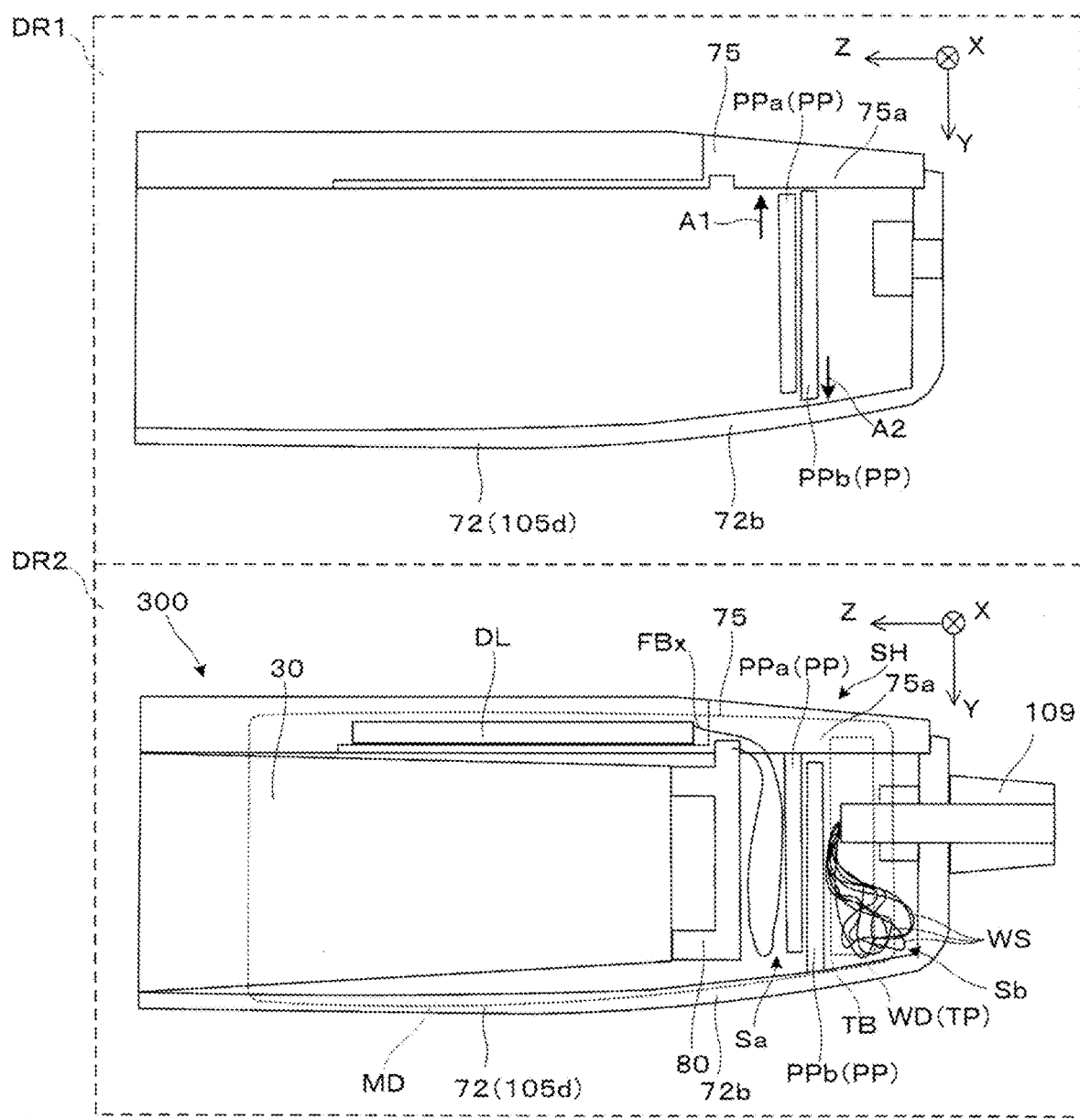
FIG. 11 is a conceptual side cross-sectional view for illustrating an optical device according to a third exemplary embodiment.

FIG. 11 is a conceptual side cross-sectional view illustrating an appearance of the optical device 300 according to the present exemplary embodiment, and corresponds to FIGS. 7 and 10.

In FIG. 11, a first region DR1 is a diagram illustrating a state of assembly of the partition plate PP (or the holding member SH) for the optical device 300 as one example of the present exemplary embodiment, and a second region DR2 is a diagram illustrating the optical device 300 in the present exemplary embodiment after the partition plate PP is assembled.

For example, as illustrated in FIG. 7 and the first region CR1 in FIG. 10, the partition plate PP (protrusion portions PPa and PPb) in the optical device 100 according to the first exemplary embodiment is formed so as to extend integrally from the board holder 75 and the second member 72 that constitutes the outer packaging 105d. In contrast, as in one example illustrated in the first region DR1 in FIG. 11, the optical device 300 in the present exemplary embodiment includes the partition plate PP as a separate member being attached and fixed, and is different from the optical device 100 in the first exemplary embodiment and the like in this point. In other words, in a case of the present exemplary embodiment, first, a plate-like member that is to become the protrusion portion PPa is brought closer to the board holder 75 in a direction indicated by an arrow A1, and the plate-like member is attached to a predetermined place of the board holder 75. Further, similarly, a plate-like member that is to become the protrusion portion PPb is brought closer in a direction indicated by an arrow A2, and the plate-like member is attached to a predetermined place of the second member 72 that constitutes the outer packaging 105d. Subsequently, as in one example illustrated in the second region DR2, the optical device 300 is manufactured by attaching each component including the flexible board FBx and the harness 109.

Also, in the optical device 300 according to the present exemplary embodiment, the board holder 75 causes the end portion TB of the main circuit board MD to be disposed in a state of protruding toward the side closer to the harness 109 than the display element 80, namely, the optical path upstream side (−z side), and then fixes the end portion TB. Thus, a space for avoiding interference can be provided on the optical path upstream side of the display element 80, namely, on the back surface side of the display element while suppressing an increase in size of the optical device 300 toward the lateral side and the like. Further, the partition plate PP attached to the board holder 75 or the outer packaging 105d afterward functions as the holding member SH that holds the flexible board FBx and the harness 109 in a separated state, and thus interference between the flexible board FBx and the harness 109 can be avoided.

Fourth Exemplary Embodiment

An optical device according to a fourth exemplary embodiment will be described below with reference to FIG. 12. Note that the optical device according to the present exemplary embodiment is a modified example of the optical device 100 according to the first exemplary embodiment and the like, and is different from the first exemplary embodiment and the like in that another structure is adopted instead of the partition plate PP as the holding member SH. However, other points are similar to those in the first exemplary embodiment and the like, and thus detailed description of each component other than the components described above will be omitted.

Figure 12:
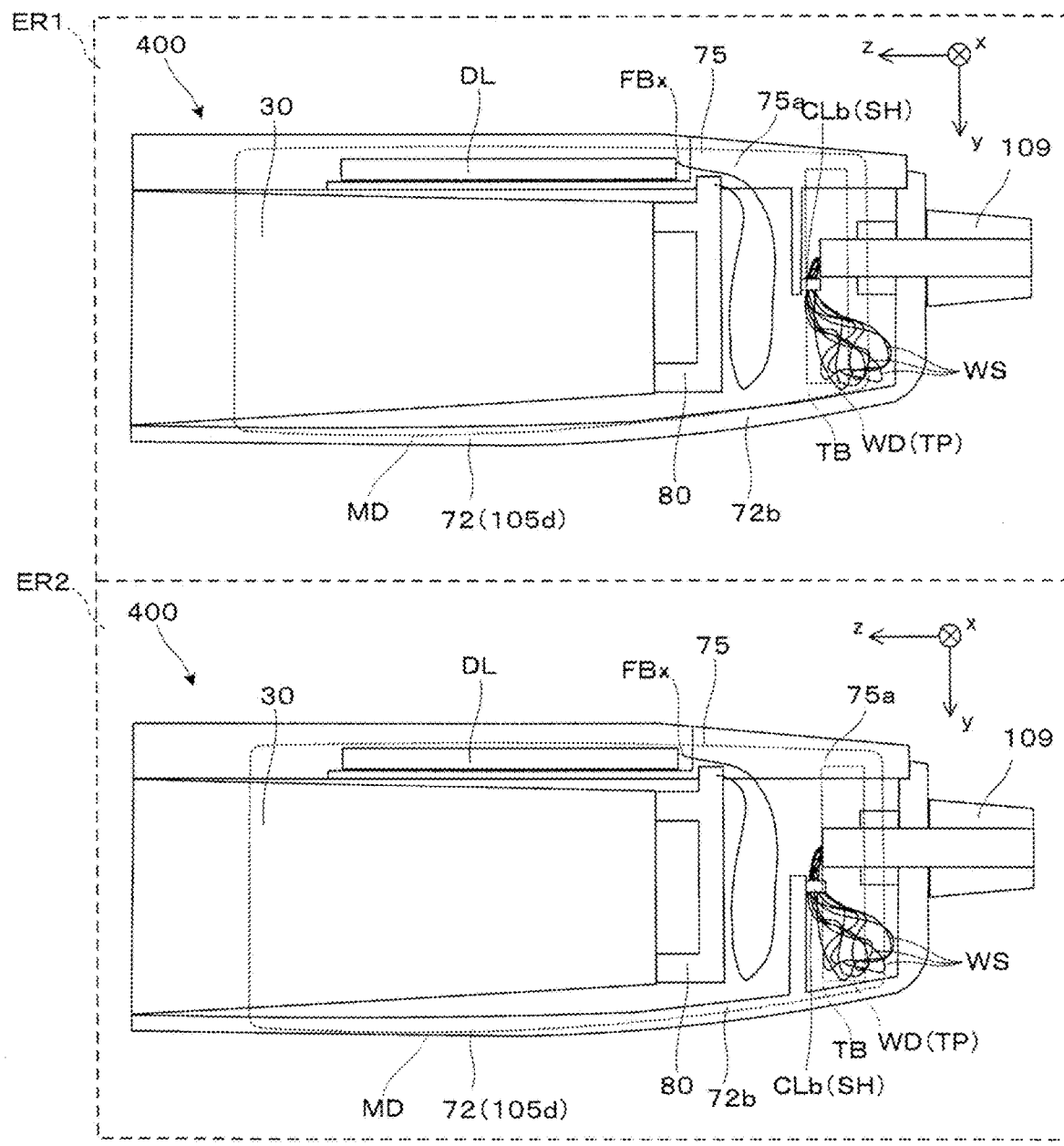
FIG. 12 is a conceptual side cross-sectional view for illustrating an optical device according to a fourth exemplary embodiment.

FIG. 12 is a conceptual side cross-sectional view illustrating an appearance of the optical device 400 according to the present exemplary embodiment, and corresponds to FIGS. 7, 10, and 11.

In FIG. 12, a first region ER1 is a diagram illustrating the optical device 400 as one example of the present exemplary embodiment, and a second region ER2 is a diagram illustrating the optical device 400 as one modified example of the present exemplary embodiment.

First, as in one example illustrated in the first region ER1, it is clear from a comparison with the optical device 100 illustrated in the first region CR1 in FIG. 10, for example, that the optical device 400 in the present exemplary embodiment is different from the optical device 100 in the first exemplary embodiment and the like in that the optical device 400 includes, as the holding member SH, a clip member CLa that clips the harness 109 instead of the partition plate PP. More precisely, the clip member CLa bundles and clips the plurality of wires WS constituting a tip end side of the harness 109. In other words, in the present exemplary embodiment, interference between the flexible board FBx and the harness 109 can be avoided by restricting the arrangement of the harness 109 by the clip member CLa.

Note that the illustrated example illustrates the clip member CLa formed on the tip end side of the plate-like portion 75a extending from the board holder 75 such that the clip member CLa is provided near the harness 109, but the present disclosure is not limited to this, and various aspects can be taken as long as desired clipping can be achieved.

Further, as in one modified example illustrated in the second region ER2, in the optical device 400 in the present exemplary embodiment, a clip member CLb for bundling and clipping the plurality of wires WS may be provided on the second member 72 that constitutes the outer packaging 105d. In other words, the clip member CLb provided on the second member 72 constitutes the holding member SH that holds the flexible board FBx and the harness 109 in a separated state, and thus interference between the flexible board FBx and the harness 109 may be able to be avoided.

Modified Example and Other Matter

The structure described above is illustrative, and various modifications can be made to the extent that similar functions can be achieved.

In the description above, the partition plate PP (the protrusion portions PPa and PPb) and the clip members CLa and CLb have been illustrated as a specific aspect of the holding member SH. However, the present disclosure is not limited to this, and various aspects can be adopted as the holding member SH that can hold the flexible board FBx and the harness 109 in a separated state. Note that, in a case of the partition plate PP and the clip members CLa and CLb described above, the partition plate PP and the clip members CLa and CLb are non-adhesive fixed, and thus workability when the optical device is reassembled for repair or the like can be improved as compared to a case in which the flexible board FBx and the harness 109 are adhesive-fixed and maintained in a separated state, for example.

Further, each of the aspects of the above-described holding member SH illustrated in each of the exemplary embodiments may be configured by appropriately combining the possible components.

Further, for the partition plate PP, as long as interference between the flexible board FBx and the harness 109 can be avoided by partitioning a space, the partition plate PP may have a shape other than a plate shape, and, for example, a member corresponding to the partition plate PP may be formed of a reticulated member.

Further, the central member 50 has a smoothly coupled configuration without having a curve portion (bent portion), but the present application is also applicable to a configuration having a curve portion (bent portion).

In the description above, the display element 80 is an organic EL display panel or an LCD panel, but the display element 80 may be a self-luminous display element represented by an LED array, a laser array, a quantum dot light-emitting element, and the like. Furthermore, the display element 80 may be a display using a laser scanner that combines a laser light source and a scanner. Note that a liquid crystal on silicon (LCOS) technique can also be used instead of an LCD panel.

The virtual image forming optical portions 101a and 101b may block outside light by covering the front of the eye. In this case, an external scene cannot be directly observed, but an external scene captured by the camera can be observed.

As described above, an optical device in one specific aspect includes a display element configured to emit imaging light, a circuit board configured to process a video signal, a circuit board holder configured to fix the circuit board, and a harness coupled to the circuit board, and the circuit board holder causes an end portion of the circuit board to be disposed in a state where the end portion protrudes toward a side closer to the harness than to the display element.

In the optical device described above, since the end portion of the circuit board is disposed in the state of protruding toward the side closer to the harness than the display element, namely, toward an optical path upstream side, a space can be provided on the optical path upstream side of the display element, namely, on a back surface side of the display element. Thus, interference between the other member in the device and the harness can be avoided in coupling to the circuit board of the harness while suppressing an increase in size of the device.

In a specific aspect, the circuit board includes, in the end portion, a wiring lead-out portion that couples the harness.

In this case, the harness can be coupled to the wiring lead-out portion while avoiding interference with the other member.

In another aspect, the circuit board is provided on a side farther from a wearer than from the display element, and the wiring lead-out portion is provided on a side closer to the wearer in the end portion. In this case, an effect of heat generation in the circuit board on the wearer can be suppressed, and the wiring lead-out portion can also be appropriately provided while suppressing an increase in size in the lateral direction of the device.

In still another aspect, the wiring lead-out portion is provided individually at a plurality of places of the end portion. In this case, for example, even when the number of wiring lines is great, it is more easily handled.

In still another aspect, a holding member configured to hold a flexible board, which is configured to transmit an image signal to the display element, and the harness, in a staate of separation from each other is further provided. In this case, interference between the flexible board and the harness can be avoided by the holding member.

In still another aspect, the holding member is a partition plate configured to partition a space at the flexible board side and a space at the harness side. In this case, interference between the flexible board and the harness can be avoided by providing the spaces by the partition plate.

In still another aspect, the partition plate is formed to extend integrally from the circuit board holder. In this case, the partition plate can be formed of the same material as that for the circuit board holder. Further, the partition plate can be integrally formed with the circuit board holder.

In still another aspect, the partition plate is a separate member that is attached and fixed to the circuit board holder. In this case, the partition plate can be attached afterward.

In still another aspect, the holding member is a clip member configured to clip the harness. In this case, the harness can be fixed by clipping without interfering with the other member.

In still another aspect, the circuit board includes a main circuit board configured to process a video signal input from outside, and a drive circuit board configured to control a display operation of the display element under control of the main circuit board, the harness is coupled to the main circuit board and transmits a signal from the outside, and the flexible board couples the display element and the drive circuit board. In this case, a signal is transmitted from the outside to the main circuit board via the harness, and video based on the transmitted signal from the outside is projected by the display element that operates according to a drive signal from the drive circuit board via the flexible board.

In still another aspect, the drive circuit board is housed in the circuit board holder, with the drive circuit board being disposed closer to the display element side than the main circuit board with respect to the harness.

In still another aspect, an optical fixing member configured to fix an optical system guiding light from the display element is further provided, the optical system includes a projection optical system that projects light from the display element, and a light-guiding optical system that guides light passing through the projection optical system to the front of an eye, and the optical fixing member is assembled to the circuit board holder. In this case, an image is displayed by a virtual image in front of the eye by the optical system described above. Further, in this case, the circuit board holder is fixed in a desired positional relationship with respect to the optical fixing member.

Further, a wearable display device in one specific aspect includes the optical device according to any of the descriptions above.

In the wearable display device described above, since the end portion of the circuit board of the optical device is disposed in the state of protruding toward the side closer to the harness than the display element, namely, toward the optical path upstream side, a space can be provided on the optical path upstream side of the display element, namely, on the back surface side of the display element. Thus, interference between the other member in the device and the harness can be avoided in coupling to the circuit board of the harness while suppressing an increase in size of the device.

What is claimed is:
1. An optical device, comprising:
a display element configured to emit imaging light;
a lens configured to emit the imaging light from the display element;
a circuit board configured to process a video signal and to be disposed to overlap each of the display element and the lens in view from a normal direction of the circuit board;
a circuit board holder configured to fix the circuit board; and
a harness coupled to the circuit board, wherein
the circuit board holder causes an end portion of the circuit board to be disposed in a state where the end portion protrudes toward a side closer to the harness than to the display element, and
the display element is disposed between the end portion and the lens.
2. The optical device according to claim 1, wherein
the circuit board includes, in the end portion, a wiring lead-out portion that couples the harness.
3. The optical device according to claim 2, wherein
the circuit board is provided on a side farther from a wearer than from the display element, and the wiring lead-out portion is provided on a side closer to the wearer in the end portion.
4. The optical device according to claim 2, wherein
the wiring lead-out portion is provided individually at a plurality of places of the end portion.
5. The optical device according to claim 1, further comprising a holding member configured to hold a flexible board, which is configured to transmit an image signal to the display element, and the harness, in a state of separation from each other.
6. The optical device according to claim 5, wherein
the holding member is a partition plate configured to partition a space at the flexible board side and a space at the harness side.
7. The optical device according to claim 6, wherein
the partition plate is formed to extend integrally from the circuit board holder.
8. The optical device according to claim 6, wherein
the partition plate is a separate member that is attached and fixed to the circuit board holder.
9. The optical device according to claim 5, wherein
the holding member is a clip member configured to clip the harness.
10. The optical device according to claim 5, wherein
the circuit board includes a main circuit board configured to process a video signal input from outside, and a drive circuit board configured to control a display operation of the display element under control of the main circuit board, the harness is coupled to the main circuit board and transmits a signal from outside, and the flexible board couples the display element and the drive circuit board.

11. The optical device according to claim 10, wherein the drive circuit board is housed in the circuit board holder, with the drive circuit board being disposed closer to the display element side than the main circuit board with respect to the harness.

12. The optical device according to claim 1, comprising an optical fixing member configured to fix an optical system guiding light from the display element, wherein the optical system includes a projection optical system that projects light from the display element, and a light-guiding optical system that guides light passing through the projection optical system to a front of an eye, and the optical fixing member is assembled to the circuit board holder.

13. A wearable display device comprising the optical device according to claim 1.

* * * * *